W. A. JORDAN.
Apparatus for Clarifying Cane Juice.

No. 43,509.

Patented July 12, 1864.

UNITED STATES PATENT OFFICE.

WM. A. JORDAN, OF NEW ORLEANS, LOUISIANA.

IMPROVED APPARATUS FOR CLARIFYING CANE-JUICE.

Specification forming part of Letters Patent No. 43,509, dated July 12, 1864.

*To all whom it may concern:*

Be it known that I, W. A. JORDAN, of New Orleans, in the parish of Orleans and State of Louisiana, have invented a new and Improved Apparatus for Clarifying Cane-Juice; and I do hereby declare that the following is a full, clear, and exact description thereof, which will enable others skilled in the art to make and use the same, reference being had to the accompanying drawings, making a part of this specification, in which—

Figure 1:
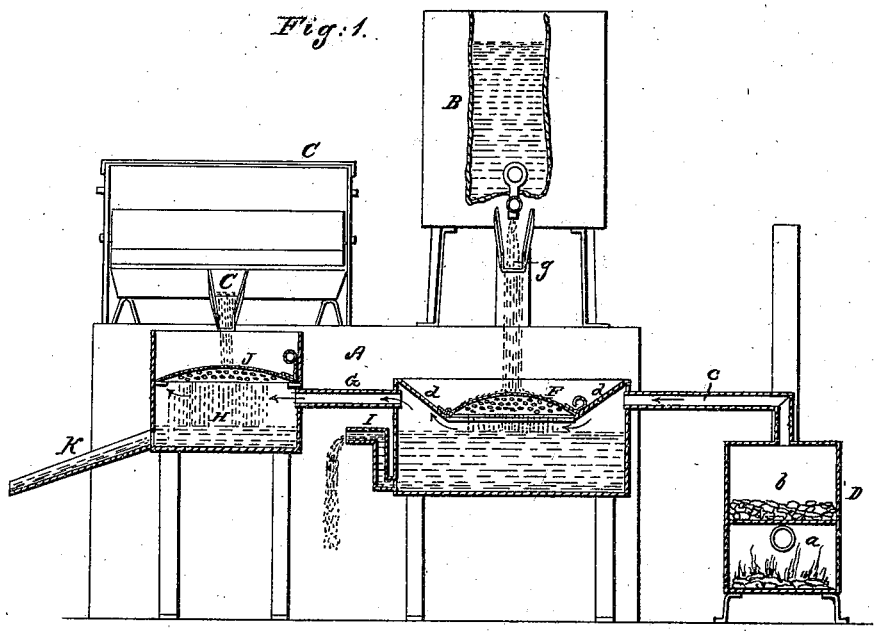
Figure 2:
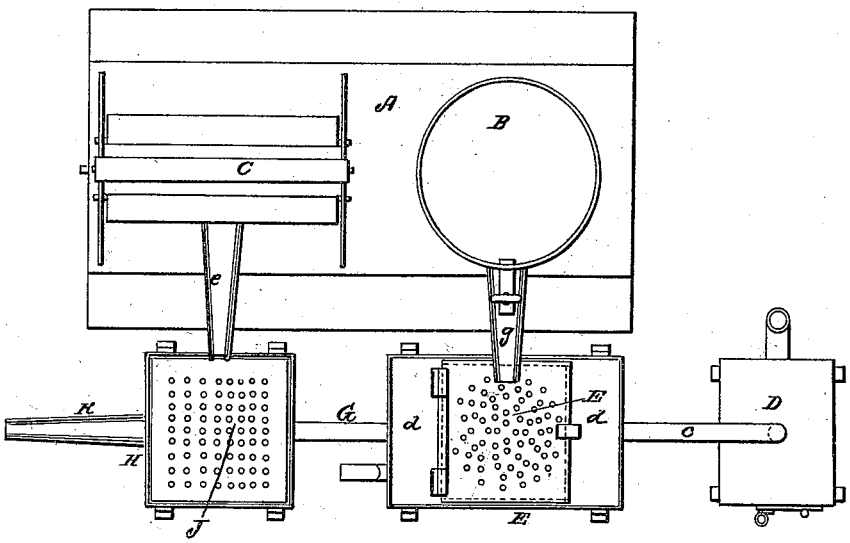

Figure 1 is a side sectional elevation of my invention. Fig. 2 is a plan view of the same.

Similar letters of reference indicate like parts.

This invention pertains to that class of apparatus used in the clarifying of cane-juice by means of sulphur-gas.

A is an elevated platform, constructed in suitable manner for the support upon it of a large water-tank, B, and the roller machinery C, for expressing the cane-juice.

D is a stove having a fire-chamber, $a$, and above it a sulphur-oven, $b$. Pipe $c$ conducts the sulphur-gas from oven $b$ into the purifying-box E, as indicated by the arrows. The upper part of box E is partly covered by the inclined end board, $d\ d$, between which and attached by hinges to one of the end boards is a perforated spherical-shaped cover, F.

G is the gas-pipe which conducts the purified gas from the box E to the juice-receptacle H, which is charged by the flow of juice from the trough $e$ of the roller-machine C.

I is a waste-pipe attached to box E, bent up from the bottom of the box, as shown, to permit the exit of water when it has risen to a line within the box equal in height to the discharge-orifice of the pipe I. A constant water line or level is thus maintained in the box E. The juice-receptacle H is provided with a perforated oval-shaped hinged cover, J, as shown, and has a discharge-trough, K, at its bottom.

The operation is as follows: Fire being made in the stove, the sulphur-gas fumes pass along pipe $c$ into the purifying-box E, into which there is now descending a flow of water from tank B through trough $g$. The water falls upon the spherical top of the perforated cover F, and the peculiar form of the cover causes the water to spread over its surface in an even sheet, and to pass through it in the manner of a fine and constantly-descending rain, through which rain the gas passes on its way to the juice-box, being thereby purified, the gas then entering through pipe G into the cane-juice receptacle H. The juice is also introduced into this receptacle in the form of a fine rain by falling from the trough $e$ upon the spherical-shaped perforated cover J in the manner just described in connection with the water in the water-box. This sulphur-gas passes into this rain of cane-juice, and quickly effects the clarification by chemical action, and the clarified juice escapes through trough K into suitable vessels there placed for its reception, while the gas also finds its way into the atmosphere.

I do not claim, broadly, the clarifying of cane-juice by means of sulphur-gas; but,

Having thus described my invention, what I claim as new, and desire to secure by Letters Patent, is—

1. The combination together of the stove, water-tank, purifying-box, and juice-clarifying receptacle, in the manner and for the purpose herein shown and described.

2. Passing the gas successively into a rain of water and a rain of cane-juice, substantially in the manner and for the purpose herein shown and described.

3. The employment of the spherically-shaped perforated covers F J, to produce said rains, substantially in the manner herein shown and described.

4. The combination of the waste-pipe I, when constructed and operating as shown, with the water-box E, as and for the purpose set forth.

WILLIAM A. JORDAN.

Witnesses:
   H. D. MEAD,
   JNO. JENER.